A. A. OSSA.
PROCESS OF EXTRACTING COPPER.
APPLICATION FILED DEC. 20, 1918.
1,343,153.
Patented June 8, 1920.
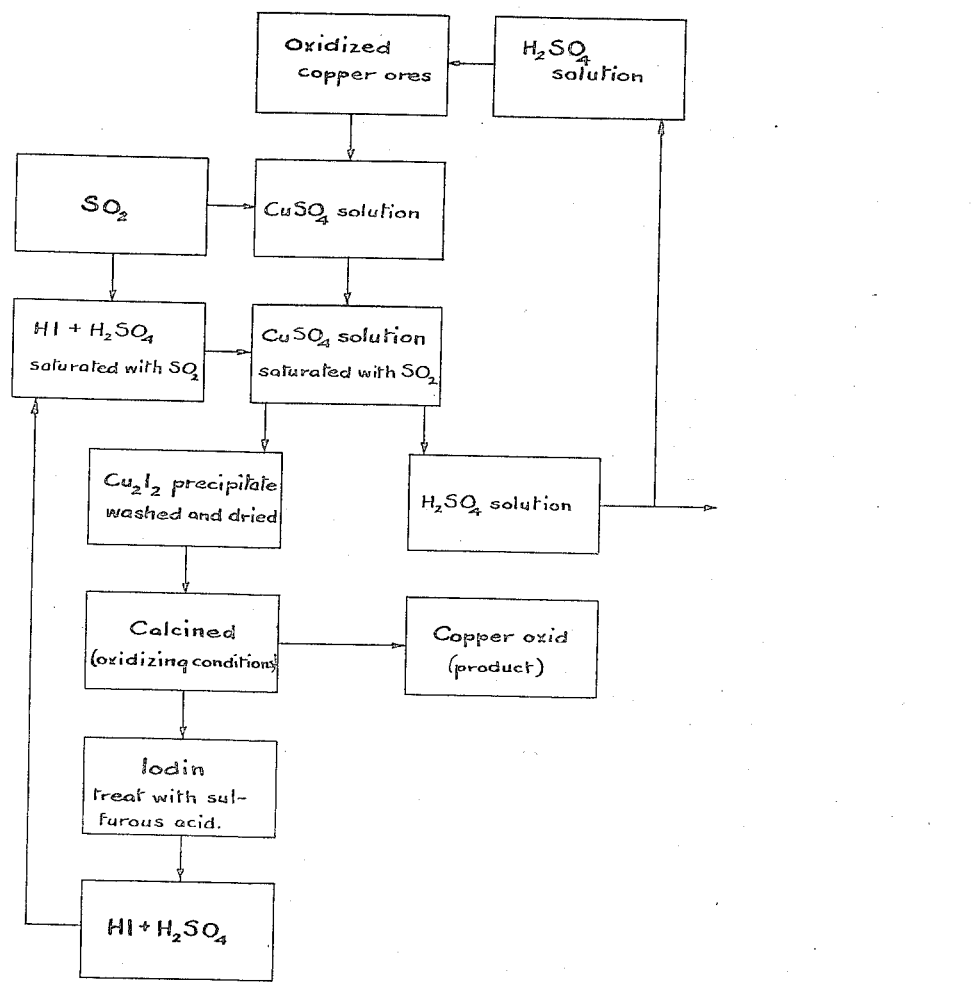
Inventor
Arturo Amenabar Ossa
By Byrnes Townsend & Bicklenstein,
Attorneys

UNITED STATES PATENT OFFICE.

ARTURO AMENABAR OSSA, OF VALPARAISO, CHILE.

PROCESS OF EXTRACTING COPPER.

1,343,153. Specification of Letters Patent. Patented June 8, 1920.

Application filed December 20, 1918. Serial No. 267,621.

*To all whom it may concern:*

Be it known that I, ARTURO AMENABAR OSSA, a citizen of the Republic of Chile, residing at Valparaiso, Chile, South America, have invented certain new and useful Improvements in Processes of Extracting Copper, of which the following is a specification.

This invention is a hydro-metallurgical process for the recovery of copper from copper-bearing minerals, with simultaneous production of sulfuric acid. In its preferred embodiment the process steps constitute a closed operating cycle in which iodin is an essential and recoverable reagent.

The process is based primarily upon the interaction between solutions of copper sulfate and hydriodic acid in the presence of sulfurous acid. In this reaction a precipitate of cuprous iodid ($Cu_2I_2$) is formed and sulfuric acid is set free. The iodin is eventually recovered in form for re-use in the process, and the sulfuric acid is available for leaching oxidized copper ores for the preparation of additional copper sulfate solution. The sulfur dioxid, which may be obtained by roasting sulfid copper-bearing ores, or from any other desired source, is ultimately oxidized to sulfuric acid, and is available for leaching or other purposes.

The accompanying drawing is a diagrammatic representation in the form of a flow sheet of the cyclical embodiment of the process.

The operation may conveniently be described as comprising three principal operating stages as follows:

1. Preparation of hydriodic acid solution. This is conveniently effected by suspending pulverized iodin in water in a covered tank, and subjecting it to a current of sulfur dioxid; or, alternatively, a mixture of sulfur dioxid and iodin vapor may be passed upwardly through a tower filled with inert material, and supplied at the top with a spray of water. The resulting solution, containing sulfuric acid and hydriodic acid, preferably with an excess of sulfur dioxid, may be repeatedly circulated until the desired concentration is reached. The reaction whereby hydriodic and sulfuric acids are formed is expressed as follows:

$$SO_2 + I_2 + 2H_2O = H_2SO_4 + 2HI.$$

2. Precipitation of cuprous iodid. A solution of copper sulfate, preferably concentrated, previously prepared by leaching oxidized copper ores in accordance with any approved practice, is first saturated with sulfur dioxid in order to prevent the liberation of iodin during the ensuing reaction. The solution containing hydriodic acid, prepared as described under "1," and containing also free sulfurous acid, is now added in sufficient proportion for the complete precipitation of the copper as cuprous iodid. This reaction may be expressed as follows:

$$2CuSO_4 + 2HI + SO_2 + 2H_2O = Cu_2I_2 + 3H_2SO_4$$

3. Regeneration of iodin. The precipitate of cuprous iodid is separated from the liquor, preferably by decantation followed by filtration and washing. The precipitate is then dried by gentle heating, and is preferably mixed with approximately 20%, more or less, by weight of cupric oxid which serves to prevent fusion or slagging of the precipitate, and thereby accelerates the reaction and renders it more complete. The mixture is then calcined in a closed furnace under oxidizing conditions, for example in a current of air. Thereby the cuprous iodid is transformed into cupric oxid, and iodin is set free, the reaction being expressed as follows:

$$Cu_2I_2 + nCuO + O_2 = (n+2)CuO + I_2.$$

The liberated iodin sublimes and is condensed and may be returned to the first operating stage for the regeneration of the hydriodic acid solution.

The liquor from which the cuprous iodid precipitate has been removed contains in addition to the sulfates derived from other components of the ore, free sulfuric acid derived both from the copper sulfate and from the oxidation of the sulfur dioxid. This acid solution is directly available for leaching fresh batches of oxidized ore.

The reactions of the first and second operating stages may conveniently be expressed in the form of a combined equation as follows:

$$2CuSO_4 + I_2 + 2SO_2 + 4H_2O = Cu_2I_2 + 4H_2SO_4$$

from which it will be apparent that the process requires for two molecular weights of copper, two molecular weights of sulfur dioxid and two of iodin: or, approximately, 1 kilo of copper requires about 1 kilo of sulfur dioxid and 2 kilos of iodin. The iodin however is not consumed in the process and is substantially recovered for re-use, subject of course to operating losses. The process may therefore be operated as a closed cycle in which the copper-bearing mineral and sulfur dioxid (transformed in the operation into sulfuric acid) are the essential raw materials. In case the sulfur dioxid is obtained by roasting the sulfid ores of copper, the copper-bearing mineral may be regarded as the sole raw material required by the process.

I claim:

1. A cyclic process of recovering copper from oxidized ores thereof, comprising leaching the ore with a solution containing sulfuric acid; precipitating copper as iodid by means of hydriodic acid in presence of sulfur dioxid with coincident formation of sulfuric acid; and regenerating hydriodic acid from the iodid precipitate.

2. A cyclic process of recovering copper from oxidized ores thereof, comprising leaching the ore with a solution containing sulfuric acid; precipitating copper as iodid by means of hydriodic acid in presence of sulfur dioxid with coincident formation of sulfuric acid; and regenerating hydriodic acid by calcining the iodid precipitate, collecting the liberated iodin, and reacting thereon with sulfur dioxid in presence of water.

3. A cyclic process of recovering copper from oxidized ores thereof, comprising leaching the ore with a solution containing sulfuric acid; precipitating copper as iodid by means of hydriodic acid in presence of sulfur dioxid with coincident formation of sulfuric acid; and regenerating hydriodic acid by calcining the iodid precipitate in presence of copper oxid, collecting the liberated iodin and reacting thereon with sulfur dioxid in presence of water.

In testimony whereof I affix my signature.

ARTURO AMENABAR OSSA.